(12) United States Patent
Duermaier

(10) Patent No.: US 10,843,552 B2
(45) Date of Patent: Nov. 24, 2020

(54) MOTORCYCLE INTAKE AIR GUIDE FOR A MOTORCYCLE ENGINE

(71) Applicant: Bayerische Motoren Werke Aktiengesellschaft, Munich (DE)

(72) Inventor: Fritz Duermaier, Bruckberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/288,959

(22) Filed: Feb. 28, 2019

(65) Prior Publication Data

US 2019/0193555 A1   Jun. 27, 2019

Related U.S. Application Data

(63) Continuation of application No. PCT/EP2017/076016, filed on Oct. 12, 2017.

(30) Foreign Application Priority Data

Oct. 18, 2016   (DE) .......................... 10 2016 220 301

(51) Int. Cl.
  *B60K 13/02*   (2006.01)
  *B62K 19/32*   (2006.01)
  (Continued)

(52) U.S. Cl.
  CPC .............. *B60K 13/02* (2013.01); *B62K 19/32* (2013.01); *F02M 35/10* (2013.01);
  (Continued)

(58) Field of Classification Search
  CPC ........ B60K 13/02; B60K 13/00; B60K 13/06; B62K 19/32; B62K 19/30; B62K 19/00;
  (Continued)

(56) References Cited

U.S. PATENT DOCUMENTS 5,301,767 A * 4/1994 Shiohara ................ B60K 13/06
                                                                    180/219
5,577,570 A * 11/1996 Shiohara ................ B60K 13/02
                                                                    180/219
(Continued)

FOREIGN PATENT DOCUMENTS

CN          104640746 A        5/2015
DE    10 2014 116 817 A1      5/2015
(Continued)

OTHER PUBLICATIONS

International Search Report (PCT/ISA/210) issued in PCT Application No. PCT/EP2017/076016 dated Jan. 15, 2018 with English translation (six (6) pages).
(Continued)

*Primary Examiner* — James M Dolak
(74) *Attorney, Agent, or Firm* — Crowell & Moring LLP

(57) ABSTRACT

A motorcycle intake air guide for guiding an intake air volumetric flow from a front region of a motorcycle to a motorcycle internal combustion engine includes a front air guiding duct, a rear air guiding duct arranged downstream of the front air guiding duct, and a steering head bypass region arranged between and connecting the front and the rear air guiding ducts to one another. The front and the rear air guiding ducts have a closed profile. The steering head bypass region preferably has, in a steering head cross-sectional plane which is arranged orthogonally with respect to a main flow direction of the intake air volumetric flow in the steering head bypass region, a non-closed profile for guiding the intake air volumetric flow around a steering head recess through which a steering head of the motorcycle extends. The steering head may close the non-closed profile at the steering head recess.

8 Claims, 2 Drawing Sheets

(51) Int. Cl.
*F02M 35/16* (2006.01)
*F02M 35/10* (2006.01)

(52) U.S. Cl.
CPC ... *F02M 35/10013* (2013.01); *F02M 35/10118* (2013.01); *F02M 35/162* (2013.01); *B60Y 2200/12* (2013.01); *B60Y 2200/13* (2013.01)

(58) Field of Classification Search
CPC ............. F02M 35/10; F02M 35/162; F02M 35/10013; F02M 35/10118; F02M 35/00; F02M 35/10111; F02M 35/10091
See application file for complete search history.

(56) References Cited

U.S. PATENT DOCUMENTS

| | | | |
|---|---|---|---|
| 6,619,415 B1 * | 9/2003 | Hasumi | B62J 17/02 180/68.1 |
| 7,143,854 B2 * | 12/2006 | Arnold | B62K 11/04 180/229 |
| 7,270,207 B2 * | 9/2007 | Idei | F02B 61/02 180/219 |
| 7,380,624 B2 * | 6/2008 | Momosaki | F02M 35/10013 180/68.3 |
| 8,418,791 B2 | 4/2013 | Matsuda et al. | |
| 8,776,923 B2 * | 7/2014 | Nakamura | B62J 35/00 180/68.1 |
| 8,881,859 B2 * | 11/2014 | Nakamura | B62J 17/02 180/229 |
| 8,936,123 B2 * | 1/2015 | Kogo | B62J 99/00 180/68.3 |
| 9,004,209 B2 * | 4/2015 | Kontani | B62K 11/00 180/68.3 |
| 9,016,421 B2 * | 4/2015 | Kontani | B62K 11/00 180/219 |
| 9,370,996 B2 * | 6/2016 | Kawata | F02M 35/10144 |
| 9,587,600 B2 * | 3/2017 | Tsubone | F02M 35/0204 |
| 9,677,516 B2 * | 6/2017 | Naruoka | F02B 33/44 |
| 9,878,756 B2 * | 1/2018 | Wakita | B62J 15/02 |
| 10,352,281 B2 * | 7/2019 | Matsuda | B62K 11/04 |
| 2004/0050357 A1 | 3/2004 | Idei et al. | |
| 2005/0051375 A1 | 3/2005 | Momosaki | |
| 2009/0013953 A1 | 1/2009 | Fujita et al. | |
| 2014/0090912 A1 | 4/2014 | Kontani et al. | |
| 2015/0136511 A1 | 5/2015 | Kawata | |

FOREIGN PATENT DOCUMENTS

| | | |
|---|---|---|
| EP | 2 042 418 A1 | 4/2009 |
| EP | 2 206 911 A | 7/2010 |
| JP | 10-35559 A | 2/1998 |

OTHER PUBLICATIONS

German-language Written Opinion (PCT/ISA/237) issued in PCT Application No. PCT/EP2017/076016 dated Jan. 15, 2018 (five (5) pages).
German-language Office Action issued in counterpart German Application No. 10 2016 220 301.0 dated Jan. 18, 2017 (two (2) pages).
Chinese-language Office Action issued in Chinese Application No. 201780056147.4 dated Jun. 28, 2020 with English translation (14 pages).

* cited by examiner

MOTORCYCLE INTAKE AIR GUIDE FOR A MOTORCYCLE ENGINE

CROSS REFERENCE TO RELATED APPLICATIONS

This application is a continuation of PCT International Application No. PCT/EP2017/076016, filed Oct. 12, 2017, which claims priority under 35 U.S.C. § 119 from German Patent Application No. 10 2016 220 301.0, filed Oct. 18, 2016, the entire disclosures of which are herein expressly incorporated by reference.

BACKGROUND AND SUMMARY OF THE INVENTION

The invention relates to a motorcycle intake air guide for a motorcycle internal combustion engine. An intake air guide in accordance with the preamble of the first patent claim is known from DE 10 2014 116 817 A1.

In the following text, the invention will be described using a single-track motorcycle; this is not to be understood to be a restriction of the invention to an embodiment of this type.

In the case of a single-track motorcycle, the front wheel is guided in a motorcycle fork. In order to make a steering movement possible, said fork is received rotatably in the motorcycle frame, in what is known as the steering head. Starting from the steering head, the motorcycle frame extends rearward, in relation to the forward driving direction. The internal combustion engine for driving the motorcycle is received in said rearwardly extending part of the motorcycle frame, that is to say behind the steering head. The internal combustion engine requires air from the surroundings, what is known as intake air, for the combustion of the fuel and therefore for the provision of the drive power. The intake air is received by way of the motorcycle intake air guide at the front of the motorcycle, in what is known as the ram pressure region, since an air pressure which assists the intake of the intake air (ram pressure region) prevails in said region at appreciable vehicle speeds. The intake air is fed to the internal combustion engine via the motorcycle intake air guide. Different manifestations for an intake air guide of this type are known from the prior art.

DE 10 2014 116 817 A1 proposes an inlet duct apparatus, by way of which the charge air can be fed to the internal combustion engine past the steering head of the motorcycle frame.

It is an object of the invention to specify an improved motorcycle intake air guide.

Within the context of the invention, a motorcycle intake air guide is to be understood to mean a device which is set up to conduct air (intake air volumetric flow) from the surroundings of the motorcycle in the direction of a motorcycle internal combustion engine of the motorcycle. The motorcycle intake air guide preferably represents a conducting or duct system. Starting from a front region, preferably a fairing and particularly preferably a headlight fairing, of the motorcycle, the motorcycle intake air guide preferably extends in the direction of the motorcycle internal combustion engine. An air filter is provided, in particular, for filtering the intake air volumetric flow; said air filter can be provided in the motorcycle intake air guide or can be arranged downstream of it in flow terms.

The motorcycle intake air guide preferably extends in flow terms between the front region of the motorcycle, from which the intake air volumetric flow is received, and the motorcycle internal combustion engine which can be fed said intake air volumetric flow, and the air filter for cleaning the intake air volumetric flow is further preferably arranged downstream in front of the motorcycle internal combustion engine and particularly preferably downstream behind the motorcycle intake air guide.

The intake air volumetric flow is provided, in particular, to contribute to the combustion of fuel in the motorcycle internal combustion engine, more precisely in one or more combustion chambers of said internal combustion engine, with the result that the motorcycle internal combustion engine outputs power for driving the motorcycle.

Within the context of the invention, an air inlet is to be understood to mean an opening in the motorcycle intake air guide, through which opening air from the surroundings of the motorcycle enters into said motorcycle intake air guide as planned.

Within the context of the invention, a front air guide duct is to be understood to mean a region of the motorcycle intake air guide, which region extends downstream in the direction of the internal combustion engine starting from the air inlet. The front air guide duct is preferably the first duct section (in relation to the flow direction of the intake air volumetric flow), through which the intake air volumetric flow is guided. The front air guide duct preferably has a closed cross-sectional profile at least in sections and preferably completely, and thus results, in particular, as a hose-like or tube-like region of the motorcycle intake air guide.

Within the context of the invention, a rear air guide duct is to be understood to mean a region of the motorcycle intake air guide, which region is arranged downstream behind the front air guide duct. The rear air guide duct is preferably the last duct section (in relation to the flow direction of the intake air volumetric flow), through which the intake air volumetric flow is guided before it exits from the motorcycle intake air guide through the air outlet. The intake air volumetric flow preferably exits from the motorcycle intake air guide through the air outlet into an air filter box and preferably through an air filter element before it flows as a cleaned intake air volumetric flow to the motorcycle internal combustion engine. The rear air guide duct preferably has a closed cross-sectional profile at least in sections and preferably completely, and thus results, in particular, as a hose-like or tube-like region of the motorcycle intake air guide.

Within the context of the invention, a steering head flow-around region is to be understood to mean a region of the motorcycle intake air guide, which region is arranged downstream between the front and the rear air guide duct. The steering head flow-around region preferably directly adjoins the front air guide duct, and the rear air guide duct further preferably directly adjoins the steering head flow-around region. The steering head flow-around region preferably connects the front and the rear air guide duct to one another. The steering head flow-around region preferably splits into two part regions which surround a steering head recess.

The steering head flow-around region preferably has a steering head cross-sectional plane. The steering head cross-sectional plane is preferably oriented orthogonally with respect to the flow direction as planned of the intake air volumetric flow in the steering head flow-around region. Said flow direction is preferably to be understood to be a main flow direction, that is to say the direction of the intake air flow without turbulences, as occurs during operation as planned. The steering head flow-around region preferably has an open (that is to say, non-closed) profile in the steering head cross-sectional plane. The steering head flow-around region is preferably configured by said open profile in the steering head cross-sectional plane in such a way that a steering head recess results which extends completely through the steering head flow-around region. The steering head recess is configured, in particular, in such a way that the steering head of a motorcycle frame has sufficient space in said steering head recess, for the case where the motorcycle intake air guide is mounted on said frame. In particular, a refinement of this type makes it possible to realize a particularly great cross-sectional area of the motorcycle intake air guide in the region of the steering head flow-around region and therefore to achieve an improved motorcycle intake air guide.

In one preferred embodiment of the invention, the steering head flow-around region has a C-shaped profile in the steering head cross-sectional plane. The limbs of said C-shaped profile are preferably set up to make contact with the steering head of the motorcycle frame. In particular, a C-shaped profile is a profile which can be produced particularly simply.

In one preferred embodiment of the invention, in particular in the region of the steering head flow-around region, the motorcycle intake air guide has a first branch and a second branch for conducting the intake air volumetric flow; in other words, the intake air volumetric flow can preferably be divided in the steering head flow-around region into two part volumetric flows in said first and said second branch; here, said division of the intake air volumetric flow takes place into two streams, in particular during operation as planned of the motorcycle intake air guide, that is to say when the latter is mounted on the motorcycle frame. Starting from the front air guide duct, the motorcycle intake air guide preferably splits into said two branches, and said two branches are further preferably combined again in the rear air guide duct. By two branches, in particular, a symmetrical configuration of the motorcycle intake air guide in the region of the steering head flow-around region is made possible, and a particularly great intake air volumetric flow can thus be fed to the motorcycle internal combustion engine.

In one preferred embodiment, the motorcycle intake air guide is configured in multiple pieces. The motorcycle intake air guide can preferably be divided in the region of the steering head flow-around region into a front and into a rear intake air guide; in particular, the motorcycle intake air guide is therefore configured in multiple pieces. The front and the rear intake air guide can preferably be connected to one another in a frictionally locking, positively locking or integrally joined manner, or preferably by a combination of at least two of said connecting types. The front intake air guide preferably has the front air guide duct and a part of the steering head flow-around region; the rear intake air guide preferably has a part of the steering head flow-around region and the rear air guide duct. The front and the rear intake air guide can preferably be connected to one another in a positively locking and preferably fluid-tight manner by a latching connection. In particular, latching connections have proven to be a reliable type of positively locking connection, and a particularly reliable motorcycle intake air guide can thus be achieved.

In particular, the motorcycle intake air guide is provided for use with a motorcycle frame; in particular, the use of the motorcycle intake air guide with the motorcycle frame results in a closed duct cross section in the region of the steering head recess for guiding the intake air volumetric flow in the region of the abovementioned steering head cross-sectional plane. Here, said duct cross section in the steering head cross-sectional plane is formed by way of the cross-sectional profile of the motorcycle intake air guide in said plane and by way of the steering head.

The motorcycle frame preferably has a steering head; a steering head bearing is preferably provided in said steering head, which steering head bearing serves to rotatably receive a motorcycle fork for guiding the motorcycle front wheel. As shown, said closed cross section of the duct for conducting the intake air volumetric flow in the steering head region in the steering head cross-sectional plane is composed, in particular, of the open profile of the motorcycle intake air guide on one side and the steering head of the motorcycle frame on the other side.

The steering head of the motorcycle frame preferably extends through the steering head recess of the motorcycle intake air guide, in so far as the motorcycle intake air guide is mounted on the motorcycle frame. The motorcycle frame preferably surrounds the motorcycle intake air guide completely in the steering head cross-sectional plane.

One section of the steering head of the motorcycle frame preferably forms a section of a duct wall of the intake air guide. In the case of a refinement of this type, the intake air volumetric flow makes contact with the motorcycle intake air guide on one side and directly with the steering head of the motorcycle frame on the other side when flowing through the motorcycle intake air guide. An inner duct wall which is formed by way of the motorcycle intake air guide is dispensed with, in particular, by a refinement of this type, since said inner duct wall is formed by way of the steering head of the motorcycle frame and, in particular, the cross section is increased as a result, through which cross section the intake air volumetric flow can flow. In the case of a refinement of this type, the motorcycle intake air guide conducts the intake air volumetric flow through the motorcycle frame.

The motorcycle intake air guide preferably comprises, as one constituent part, a plastic, preferably a fiber reinforced plastic, or said motorcycle intake air guide preferably consists of said plastic. By way of the proposed refinement, firstly a great flow cross section for the intake air volumetric flow can be achieved, and secondly low requirements are made of the motorcycle frame, since the motorcycle intake air guide forms a part of the duct for conducting the intake air volumetric flow and thus no dedicated air guide duct has to be integrated into the motorcycle frame, which as a rule leads to a higher weight of the motorcycle frame.

In one preferred embodiment of the invention, the motorcycle intake air guide has a sealing lip on an end edge which surrounds the steering head recess at least partially, preferably completely. Said sealing lip is preferably set up to make contact with the motorcycle frame, and it is preferably set up to make contact with the steering head. The sealing lip is preferably configured in such a way that it closes off the motorcycle intake air guide with respect to the motorcycle frame in the region of the steering head recess in a fluid-tight manner. A sealing lip makes it possible, in particular, to prevent or to reduce the exit of a part flow of intake air between the motorcycle frame and the motorcycle intake air guide, and an improved motorcycle intake air guide can thus be achieved.

The sealing lip preferably consists of a flexible plastic, in comparison with other constituent parts of the motorcycle intake air guide. The sealing lip can be adapted with respect to the steering head, in particular, by a flexible plastic, and an improved sealing action of the motorcycle intake air guide with respect to the motorcycle frame can be achieved.

In one preferred embodiment, the motorcycle intake air guide can be connected to the motorcycle frame in a positively locking manner and such that it can be released preferably without destruction; said motorcycle intake air guide is preferably connected to the motorcycle frame in a positively locking manner. A latching, screw or riveted connection is preferably provided to configure said positively locking connection. The motorcycle intake air guide is preferably connected to the motorcycle frame by a screw connection. A satisfactory mounting capability of the motorcycle intake air guide can be achieved, in particular, by a positively locking connection.

The motorcycle frame preferably comprises, as one constituent part, aluminum or an aluminum alloy, and the motorcycle frame preferably consists of aluminum or an aluminum alloy. The motorcycle intake air guide and the motorcycle frame therefore consist, in particular, of different materials (plastic/aluminum alloy); positively locking connections have proven particularly suitable, in particular, for connecting materials of this type. The positively locking connection is preferably configured between the motorcycle intake air guide and the motorcycle frame with the rear part of the motorcycle intake air guide which has the rear air guide duct and at least one part of the steering head flow-around region. Tests have shown that particularly advantageous mounting can be achieved, in particular, by a configuration of this type.

In one preferred embodiment of the invention, the motorcycle intake air guide comprises, as one constituent part, at least one or more plastics, or consists of said plastic or said plastics, and, further preferably, the motorcycle frame comprises, as one constituent part, an aluminum alloy or consists of the aluminum alloy.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
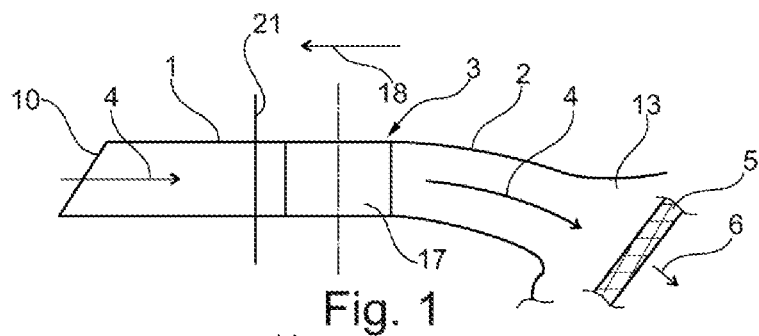
FIG. 1 shows a longitudinal sectional illustration of a motorcycle intake air guide in accordance with an embodiment of the present invention.

FIG. 1 shows a longitudinal sectional illustration of a motorcycle intake air guide. The motorcycle intake air guide has a front air guide duct 1 and a rear air guide duct 2. Via the inlet opening 10, the intake air volumetric flow 4 flows from the ram pressure region at the front of the motorcycle 100 into the motorcycle intake air guide. The front air guide duct 1 and the rear air guide duct 2 are connected to one another by way of the steering head flow-around region 3. The cross-sectional profile of the motorcycle intake air guide can be described in the cross-sectional plane 21; the cross-sectional plane is oriented orthogonally with respect to the flow direction of the intake air volumetric flow 4.

Here, the inlet opening 10 is situated in the front region of the motorcycle (not shown) which moves in the driving direction A during forward driving. The intake air volumetric flow 4 leaves the motorcycle intake air guide through the outlet opening 13, passes through the air filter 5, and flows as cleaned intake air volumetric flow 6 in the direction of the motorcycle internal combustion engine (not shown).

Figure 2:
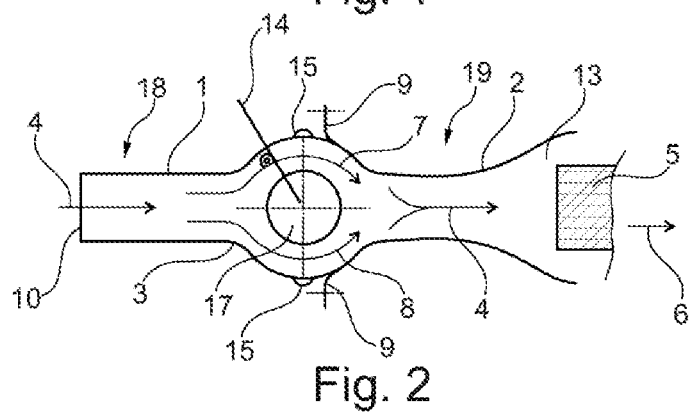
FIG. 2 shows a sectional illustration of the motorcycle intake air guide as in FIG. 1 in plan view.

FIG. 2 shows a plan view of the motorcycle intake air guide in a partial section. Here, FIG. 2 shows in principle the same motorcycle intake air guide as shown in FIG. 1, but merely in a different perspective. In the following text, the features and details which can be seen in addition in comparison with the illustration which is shown in FIG. 1 will be described.

The steering head flow-around region 3 has a steering head recess 17 which extends completely through the motorcycle intake air guide in the steering head flow-around region 3. The front intake air guide 18 has the front air guide duct 1 and a part of the steering head flow-around region 3. The rear intake air guide 19 has the rear air guide duct 2 and likewise a part of the steering head flow-around region 3. The motorcycle intake air guide is configured in two pieces as a result of this design with the front intake air guide 18 and the rear intake air guide 19.

The front intake air guide 18 can be connected in a positively locking manner to the rear intake air guide 19 by latching connections 15. During operation as planned of the motorcycle intake air guide, the intake air volumetric flow 4 splits in the steering head flow-around region 3 into a first part air flow 7 and into a second part air flow 8. This split of the intake air volumetric flow 4 occurs only for the case where the motorcycle intake air guide is mounted on the motorcycle frame (not shown). Said two part air flows 7, 8 are combined again in the rear air guide duct 2 to form the intake air volumetric flow 4. Brackets 9 are provided on the rear intake air guide 19, by which brackets 9 the motorcycle intake air guide can be connected in a positively locking manner to the motorcycle frame (not shown) by way of screw connections.

The steering head cross-sectional plane 14 is an imaginary plane which is used to describe the cross-sectional profile of the motorcycle intake air guide in the steering head flow-around region 3. Here, the steering head cross-sectional plane 14 is oriented orthogonally with respect to the air flow 7 in the steering head flow-around region 3. Here, the air flow 7 corresponds at least substantially to the air flow as results during operation as planned of the motorcycle intake air guide in the steering head flow-around region.

As has already been shown, the motorcycle intake air guide is configured in two pieces; here, the two parts 18, 19 are connected to one another in a positively locking and fluid-tight manner by way of the latching connection 15.

Figure 3:
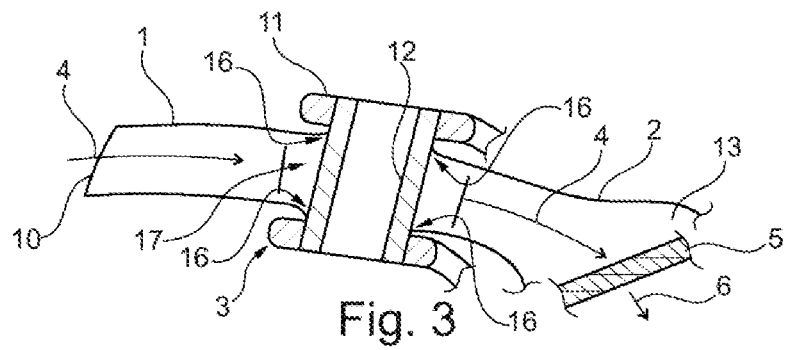
FIG. 3 shows a longitudinal sectional illustration of a motorcycle frame with a motorcycle intake air guide as in FIG. 1.

FIG. 3 shows a sectional illustration of the motorcycle intake air guide in the mounted state on the motorcycle frame 11. The motorcycle frame 11 has a steering head 12. FIG. 3 in turn shows the motorcycle intake air guide which is known from the preceding FIGS. 1 and 2. In the following text, substantially the added features of said illustration (FIG. 3) will be described.

In order to achieve a closure which is as fluid-tight as possible of the motorcycle intake air guide in the steering head flow-around region 3 with the steering head recess 17 with respect to the steering head 12, the motorcycle intake air guide has sealing lips 16 in said region. The sealing lips 16 are made from a flexible plastic, such as rubber or silicone, and make a deformation of the motorcycle intake air guide with respect to the steering head 12 possible.

Figure 4:
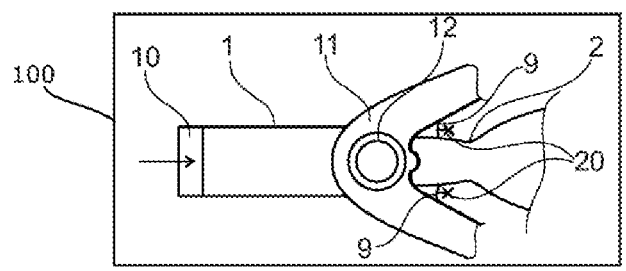
FIG. 4 shows a plan view of the motorcycle frame with the motorcycle intake air guide as in FIG. 3.

FIG. 4 shows a plan view of the motorcycle intake air guide, as fastened to the motorcycle frame 11 with the steering head 12. The motorcycle intake air guide is connected in a positively locking but releasable manner to the motorcycle frame 11 via the brackets 9 by way of a screw connection 20.

Figure 5:
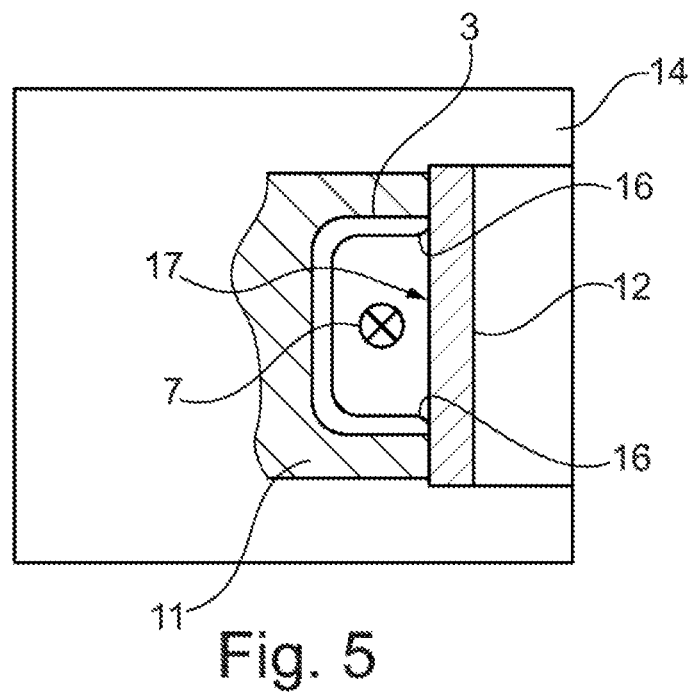
FIG. 5 shows a cross-sectional view of the steering head flow-around region of the motorcycle intake air guide as in FIG. 1.

FIG. 5 shows a sectional illustration of the motorcycle intake air guide in the steering head flow-around region 3 in the steering head cross-sectional plane 14. The C-shaped profile of the motorcycle intake air guide in the steering head flow-around region 3 can be seen particularly clearly in this illustration. In order to seal the steering head recess 17 with respect to the steering head 12, the motorcycle intake air guide has sealing lips 16 made from flexible plastic at the ends of the limbs of the C-shaped cross-sectional profile (end edge). The steering head 12 is connected to the motorcycle frame 11 in an integrally joined manner. During the mounting of the motorcycle intake air guide on the motorcycle frame 11 and therefore on the steering head 12, the sealing lips 16 are deformed and therefore bring about a sealing action. Slight leaks in the region of the sealing lips have no considerable consequences for the operation of the motorcycle intake air guide, since said leak still lies in what is known as the raw air region (upstream of the air filter). The steering head flow-around region 3 is flowed through by the part air flow 7.

Figure 6:
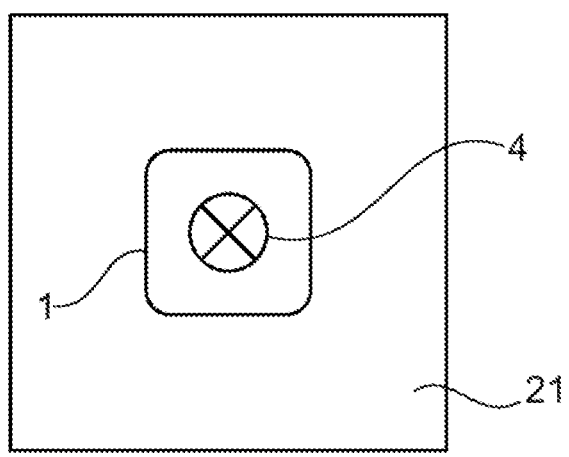
FIG. 6 shows a cross-sectional view of the front air guide duct of the motorcycle intake air guide as in FIG. 1.

FIG. 6 shows the closed profile of the front air guide duct 1 in the cross-sectional plane 21, through which closed profile the intake air volumetric flow 4 can flow. In the rear air guide duct 2, the motorcycle intake air guide likewise has a closed cross-sectional profile.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motorcycle intake air guide for guiding an intake air volumetric flow from a front region of a motorcycle to a motorcycle internal combustion engine, comprising:
    an air inlet;
    a front air guide duct adjoining the air inlet downstream in relation to a flow direction of the intake air volumetric flow;
    a rear air guide duct arranged downstream from the front air guide duct, the rear air guide duct feeding the intake air volumetric flow to an air outlet; and
    a steering head flow-around region arranged between and connecting the front and the rear air guide ducts to one another in relation to the intake air volumetric flow,
    wherein
    the front and the rear air guide ducts each have a closed profile for guiding the intake air volumetric flow,
    a flow cross-section area of the front air guide duct immediately upstream of the steering head flow-around region is essentially equal to a flow cross-section area of the rear air guide duct immediately downstream of the steering head flow-around region,
    the steering head flow-around region is passes the intake air volumetric flow around a portion of a steering head of the motorcycle that extends through a steering head recess in the steering head flow around region, and
    the steering head flow-around region at the steering head recess has a non-closed profile for guiding the intake air volumetric flow adjacent to the steering head that cooperates with the steering head to form a closed profile.

2. The motorcycle intake air guide as claimed in claim 1, wherein
    the steering head flow-around region has a C-shaped profile adjacent to the steering head recess.

3. The motorcycle intake air guide as claimed in claim 1, wherein
    the steering head flow-around region has a first branch and a second branch, and
    the first and second branches begin on a front air guide duct side of the steering head flow-around region, pass on opposite sides of the steering head recess, and recombine on a rear air guide duct side of the steering head flow-around region.

4. The motorcycle intake air guide as claimed in claim 3, wherein
    the first and second branches each have a C-shaped profile adjacent to the steering head recess, and
    limbs of the C-shaped profile of the first branch and limbs of the C-shaped profile of the second branch on opposite sides of the steering head recess are oriented toward one another.

5. The motorcycle intake air guide as claimed in claim 4, wherein
    the motorcycle intake air guide is configured in multiple pieces.

6. The motorcycle intake air guide as claimed in claim 5, wherein
    the steering head flow-around region includes a front intake air guide portion and a rear intake air guide portion.

7. The intake air guide as claimed in claim 6, wherein the front and the rear intake air guide portions are connect to one another.

8. The intake air guide as claimed in claim 7, wherein the front and the rear intake air guide portions connect to one another by a latching connection.

* * * * *